C. JERIGE.
SURFACE GAGE.
APPLICATION FILED DEC. 7, 1917.

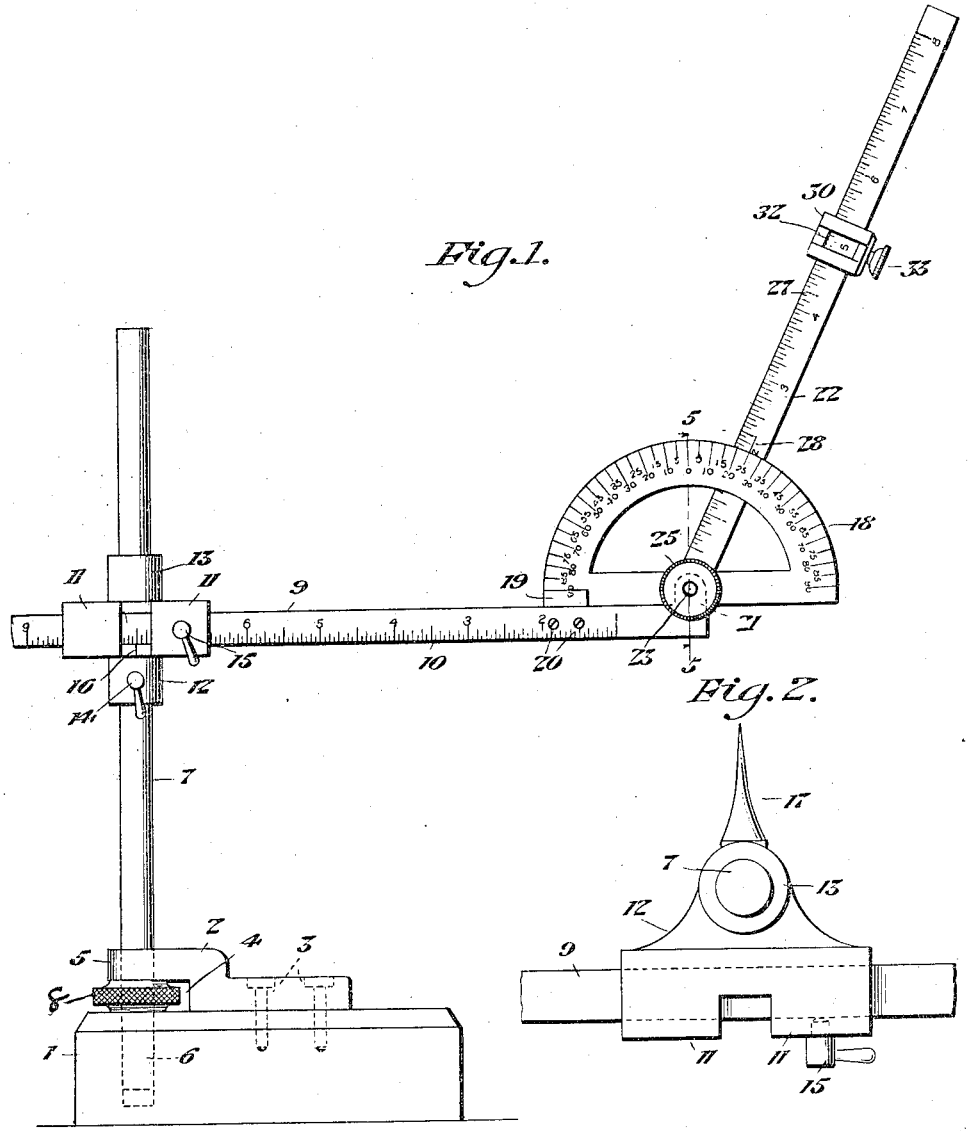

1,289,794.

Patented Dec. 31, 1918.
2 SHEETS—SHEET 2.

Witnesses

Inventor
Carl Jerige
By Victor J. Evans
Attorney

UNITED STATES PATENT OFFICE.

CARL JERIGE, OF PHOENIX, NEW YORK.

SURFACE-GAGE.

1,289,794.  Specification of Letters Patent.  Patented Dec. 31, 1918.

Application filed December 7, 1917. Serial No. 206,084.

*To all whom it may concern:*

Be it known that I, CARL JERIGE, a citizen of Austria, residing at Phoenix, in the county of Oswego and State of New York, have invented new and useful Improvements in Surface-Gages, of which the following is a specification.

This invention is an improved surface gage which is adapted for universal movement and which is also provided with adjustable scribing points, the object of the invention being to provide an improved surface gage of this character which is simple in construction and which may be readily arranged and adjusted as required.

The invention consists in the construction, combination and arrangement of devices hereinafter described and claimed.

In the accompanying drawings:—

Figure 1 is an elevation of a surface gage constructed and arranged in accordance with my invention.

Figs. 2, 3 and 4 are detailed plans of the same.

Figure 3:
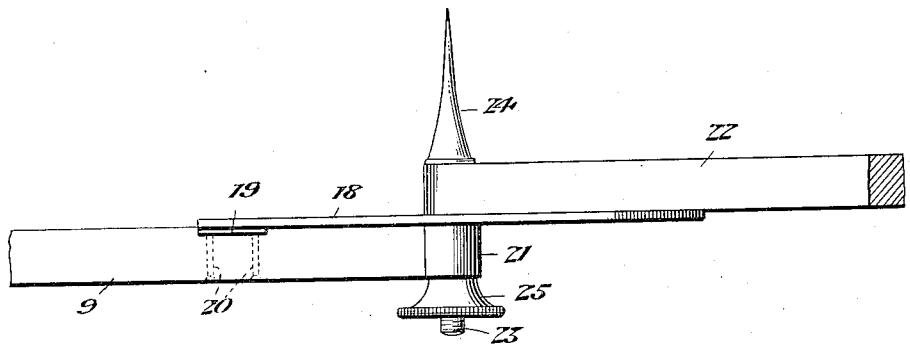

In the embodiment of my invention here shown the base 1 is provided on the upper side with a bracket 2 which is secured by screws 3 and which is recessed at one end to form a slot 4 between the base and the arm 5 of the bracket.

A vertical rod or standard 7 extends through an opening in the bracket arm 5 and into a bore 6 with which the base is provided and a nut 8 for adjusting said rod or standard is screwed thereon and is arranged in the slot 4.

A horizontal rod 9 is provided with a measuring scale 10 and is slidable longitudinally in a pair of spaced bearings 11 with which a cross-connector 12 is provided, said cross-connector having also a vertical tubular portion 13, Fig. 2, through which the standard rod 7 extends so that the cross-connector is arranged for vertical adjustment on the standard rod. The cross-connector is provided with a clamping screw 14 to secure the same at any desired adjustment on the standard rod and one of the bearings 11 of the cross-connector is provided with a clamping screw 15 to engage the horizontal rod 10 and enable the latter to be secured at any desired adjustment.

The cross-connector has an indicating line or mark 16 between the bearings 11 which coacts with the scale on the horizontal rod 9. The cross-connector is also provided, on the side opposite the bearings 11 with a scribing point 17.

Figure 4:
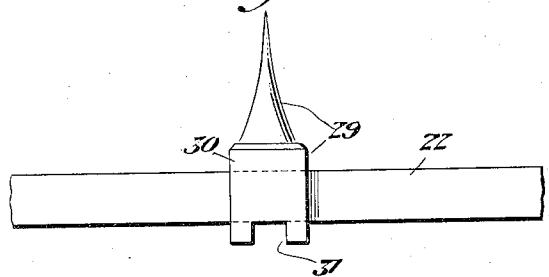
Figure 5:
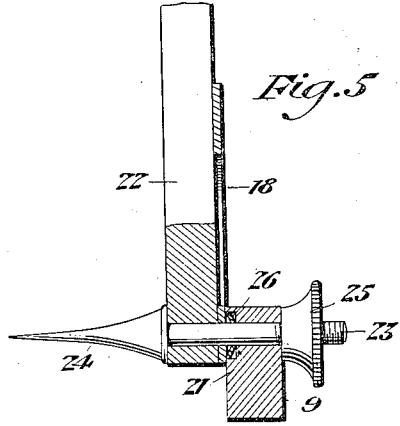
Fig. 5 is a detailed sectional view of the same taken on the plane indicated by the line 5—5 of Fig. 1.

A protractor 18 is provided at one side with a plate 19 which is secured in a recess in one side of the horizontal rod 9 by screws or pins 20. The horizontal rod is provided at the outer end with a short upwardly extending arm 21, Figs. 1 and 5, which is arranged on the center and at one side of the protractor. A bar 22 which is rectangular in cross-section is arranged on one side of the protractor and is pivotally mounted on the stem of a bolt 23 which passes through said bar near its inner end and also passes through the center of the protractor and an opening in the arm 21, the protractor being arranged between the arm 21 of the rod 9 and the bar 22 and said bar being thus pivotally connected to the protractor and arranged so that it may be turned to any desired angle and extended outwardly from the rod 9 or turned inwardly thereon as may be required, the protractor serving to indicate any angle at which the bar 22 may be arranged with respect to the rod 9, as will be understood. At one end of the pivot bolt 23 is a scribing point 24 and on the opposite end thereof is a clamping nut 25. A spring washer 26 is arranged in a recess in the arm 21 and bears between the bottom of said recess and the protractor. The bar 22 has a scale 27 and also has an indicating line or pointer 28 which coacts with the protractor to indicate the position of said bar. A scriber 29, Fig. 4, has a head 30 which is slidable on the bar 22 so that the said scriber may be adjusted on said bar as may be desired. The said head has a recess 31 through which the scale 26 is visible and also has a pointer or indicating line 32 to coact with the scale. A set screw 33 is also provided to secure the scriber 29 at any desired position on the bar 22.

My improved surface gage is adapted for use for scribing angularly related lines on work and also for locating openings to be made in work, the adjustable rod 9 enabling the point 24 to be arranged at any desired distance from the point 17; the scale 10 in coaction with the mark 16 greatly facilitating the adjustment of said rod; the protractor 18 facilitating the adjustment of the bar 22 to any desired angle with respect to the rod 9 and the head 30 enabling the point or scriber 29 to be adjusted toward and from the point 24 and the scale 27 facilitating such adjustment. By using the point 24 as a centering point on the work and by turning the bar 22 and adjusting the head 30 as may be required the point 29 may be moved to locate the centers of openings to be made in the work at any desired relation to one another and at any desired distance from the centering point 24 as will be understood. The cross connector 12 being vertically adjustable on the standards 7 enables the device to be initially set and positioned on the work so that the point 24 may be placed at the exact center of the work or at any other required point thereon.

Having thus described my invention, I claim:—

1. In a surface gage of the class described, a base, a standard rod secured to the base, a horizontal rod, a cross-connector slidable on the standard rod and in which the horizontal rod is also slidable, a protractor at the outer end of the horizontal rod, a bar pivotally connected to the protractor, a scriber on the cross-connector, a scriber concentric with the pivot of the bar and also concentric with the protractor and a scriber slidably mounted on the bar.

2. In a surface gage of the class described, a base, a standard rod secured to the base, a horizontal rod, a cross-connector slidable on the standard rod and in which the horizontal rod is also slidable, a protractor at the outer end of the horizontal rod, a bar pivotally connected to the protractor, a scriber on the cross-connector, a scriber concentric with the pivot of the bar and also concentric with the protractor and a scriber slidably mounted on the bar, the said horizontal rod having an upturned arm to which the protractor and the bar are connected.

3. In a surface gage of the class described, a base, a standard rod secured to the base, and having means by which it is vertically adjustable, a horizontal rod, a cross-connector slidable on the standard rod and in which the horizontal rod is also slidable, a protractor at the outer end of the horizontal rod, a bar pivotally connected to the protractor, a scriber on the cross-connector, a scriber concentric with the pivot of the bar and also concentric with the protractor and a scriber slidably mounted on the bar.

In testimony whereof I affix my signature.

CARL JERIGE.